United States Patent
Becerra-Novoa et al.

(10) Patent No.: US 9,938,595 B2
(45) Date of Patent: Apr. 10, 2018

(54) DIRECT REDUCTION PROCESS WITH IMPROVED PRODUCT QUALITY AND PROCESS GAS EFFICIENCY

(71) Applicants: HYL TECHNOLOGIES S.A. DE C.V., San Nicolas de Los Garza (NL); DANIELI & C. OFFICINE MECCANICHE, S.p.A., Buttrio (IT)

(72) Inventors: Jorge Octavio Becerra-Novoa, Nuevo Leon (MX); Alessandro Martinis, Udine (IT)

(73) Assignees: HYL TECHNOLOGIES, S.A. DE C.V., San Nicolas de Los Garza, Nuevo Leon (MX); DANIELI & C. OFFICINE MECCANICHE, S.P.A., Buttrio (UD) (IT)

(*) Notice: Subject to any disclaimer, the term of this patent is extended or adjusted under 35 U.S.C. 154(b) by 214 days.

(21) Appl. No.: 14/770,366

(22) PCT Filed: Feb. 27, 2014

(86) PCT No.: PCT/IB2014/000777
§ 371 (c)(1),
(2) Date: Aug. 25, 2015

(87) PCT Pub. No.: WO2014/132130
PCT Pub. Date: Sep. 4, 2014

(65) Prior Publication Data
US 2016/0002744 A1  Jan. 7, 2016

Related U.S. Application Data

(60) Provisional application No. 61/770,314, filed on Feb. 27, 2013.

(51) Int. Cl.
C21B 13/02 (2006.01)
C21B 13/00 (2006.01)

(52) U.S. Cl.
CPC ............ *C21B 13/02* (2013.01); *C21B 13/004* (2013.01); *C21B 13/0033* (2013.01);
(Continued)

(58) Field of Classification Search
CPC .... C21B 13/02; C21B 13/004; C21B 13/0073
See application file for complete search history.

(56) References Cited

U.S. PATENT DOCUMENTS 1,929,881 A * 10/1933 Darrah ................. F28D 7/1653
432/152
2,946,670 A * 7/1960 Whaley .................... C10J 1/207
48/197 R
(Continued)

FOREIGN PATENT DOCUMENTS

EP          2 738 268       6/2014
WO    WO 2010/123796     10/2010
(Continued)

OTHER PUBLICATIONS

Lepinski, J. A., "Iron by Direct Reduction", Kirk-Othmer Encyclopedia of Chemical Technology, John Wiley & Sons, 2000.*
(Continued)

*Primary Examiner* — George Wyszomierski
*Assistant Examiner* — Tima M McGuthry Banks
(74) *Attorney, Agent, or Firm* — A. Thomas S. Safford; Haug Partners LLP

(57) ABSTRACT

A direct reduction process producing DRI from iron oxide particles by reduction at a about 750° C. with a reducing gas mainly $H_2$ and CO, that also includes $CO_2$, $H_2O$, and methane, a the reduction reactor and the top gas effluent from the reduction reaction after cooling/scrubbing is split. The resulting first top gas portion with a first hydrocarbon-containing make-up gas passes through a catalytic reformer yielding an improved hot reducing gas first effluent. The
(Continued)

second top gas portion passes through a $CO_2$ removal unit and then with the second hydrocarbon-containing make-up gas passes through a heater yielding a hot $CO_2$-lean recycle reducing gas second effluent. The first and second effluents are fed to the reducing zone of the reduction reactor as the reducing gas reactant. The flow rate of at least the second of the two make-up gases is regulated to control the carbon content of the DRI produced.

20 Claims, 5 Drawing Sheets

(52) U.S. Cl.
CPC ...... *C21B 13/0073* (2013.01); *C21B 2100/22* (2017.05); *C21B 2100/26* (2017.05); *C21B 2100/282* (2017.05); *Y02P 10/122* (2015.11); *Y02P 10/126* (2015.11); *Y02P 10/128* (2015.11); *Y02P 10/136* (2015.11); *Y02P 10/143* (2015.11)

(56) References Cited

U.S. PATENT DOCUMENTS

| | | | |
|---|---|---|---|
| 3,764,123 A | * | 10/1973 | Beggs ............... C21B 13/0073 266/140 |
| 5,618,032 A | | 4/1997 | Meissner et al. |
| 6,027,545 A | | 2/2000 | Villarreal-Trevino |
| 6,395,055 B1 | | 5/2002 | Bueno et al. |
| 8,377,417 B2 | | 2/2013 | Metius et al. |

FOREIGN PATENT DOCUMENTS

| | | | |
|---|---|---|---|
| WO | WO 2011/012964 | | 2/2011 |
| WO | WO 2011012964 A | * | 2/2011 |

OTHER PUBLICATIONS

International Search Report and Written Opinion issued in the corresponding International Application No. PCT/IB2014/000777.

* cited by examiner

1

DIRECT REDUCTION PROCESS WITH IMPROVED PRODUCT QUALITY AND PROCESS GAS EFFICIENCY

This application is a National Stage Entry under 35 U.S.C. § 371 of PCT/IB2014/000777 filed on Feb. 27, 2014, published on Sep. 4, 2014, under publication number WO 2014/132130, which claims the priority benefit of U.S. Provisional Application No. 61/770,314 filed Feb. 27, 2013, the disclosures of which are incorporated by reference herein in their entirety.

FIELD OF THE INVENTION

The present invention relates to the field of iron-making, more particularly to the field of direct reduction processes wherein solid iron-oxide containing particles are chemically reduced to direct reduced iron (DRI), without melting, in a reduction reactor by means of a high-temperature reducing gas derived from a hydrocarbon, typically natural gas, which is catalytically reformed to a mixture of hydrogen and carbon monoxide. According to the present invention the production capacity of the reduction reactor can be significantly higher as compared with the processing capacity of the associated reformer while also producing DRI with improved quality.

BACKGROUND OF THE INVENTION

Direct reduction plants have been with an increasing share of metallic iron produced in the steel industry over the last decades. The production capacity of DRI (direct reduced iron) of the first plants, measured as metric tons of DRI per year, was in the range of 500,000 to 800,000 and since then direct reduction reactors have been improved in design and now operate producing 1,000,000, 1,600,000, 2000,000 and 2,500,000 or more tons of DRI per year.

Technical limitations in this scale-up of reduction reactors have been overcome, mainly related to achieving the downward flow of solids particles through the reactor at the proper rate and solids flow pattern so as to assure a uniform quality of the product which is closely related to improved reducing gas distribution, and the reactors can be properly designed for large production capacities, as mentioned before, without proportionally increasing the capacity of the typically associated reformer.

Reducing gases, mainly comprising $H_2$ and CO can be supplied from a number of sources and conversion processes, for example from natural gas which is reformed by reaction with $CO_2$ and/or $H_2O$ in a catalytic reformer; from partial combustion processes of gaseous, liquid or solid hydrocarbons such as natural gas, oil derivatives, fuel oil or coal; from pyrolysis of coal in coke ovens (coke oven gas), or from synthesis gas obtained from coal gasification.

It has been known that the hydrocarbon (for example natural gas) utilized in a direct reduction process is used for three purposes: (1) as a source of reducing gases ($H_2$ and CO) which transformation is done by catalytic reforming of such hydrocarbon with oxidants ($CO_2$ and $H_2O$); (2) as fuel for generating heat for supplying the energy for reformation and/or for heating the reducing gas to the required temperature; and (3) as carburizing agent for increasing the carbon content in the DRI to the desired levels thus reducing the electricity consumption in the subsequent melting step of the steelmaking process.

The reducing gases ($H_2$ and CO) are usually produced through the following reactions in the catalytic reformer:

$$CH_4+CO_2 \rightarrow 2CO+2H_2$$

$$CH_4+H_2O \rightarrow CO+3H_2$$

These reactions are endothermic and the energy is provided by the combustion of a suitable fuel, typically natural gas, supplemented by reducing gas purged from the system, and/or other available fuel.

The reduction of iron oxides is carried out through the following reactions:

$$Fe_2O_3+3H_2 \rightarrow 2Fe+3H_2O$$

$$Fe_2O_3+3CO \rightarrow 2Fe+3CO_2$$

Carbon content in the DRI is carried out mainly by the cracking reactions of hydrocarbons, (illustrated by the reaction of methane as the main constituent of natural gas):

$$3Fe+CH_4 \rightarrow Fe_3C+2H_2$$

The energy necessary for driving the reforming reactions is supplied to the reformer by burning any suitable fuel; which can be, for example, natural gas.

The carbon content in the DRI is mostly obtained from the cracking of hydrocarbons, and to a lesser extent from the CO content of the reducing gas fed to the reduction reactor. The potential of CO to carburize the DRI in the reduction zone according to the reaction $2CO \rightarrow C+CO_2$ is very low because at the inlet of the reduction zone the temperature is too high for the reaction to proceed and at the top of the reduction zone, where the temperature is favorable for the reaction to occur, there is no metallic iron serving as a catalyst for the reaction. Carburization by cracking of hydrocarbons is favored at high temperatures and is also catalyzed by metallic iron. These two factors are present at the bottom part of the reduction zone, where the hot reducing gas is introduced into said reduction zone, but a high concentration of hydrocarbons is necessary.

Hydrocarbon concentration in the reducing gases however cannot be high enough for producing DRI with a desired level of carbon because the gas effluent from the reformer has a low $CH_4$ concentration after having reacted with oxidants ($H_2O$ and $CO_2$) to produce $H_2$ and CO. The amount of carbon in the DRI produced in the plants where off-gas from the reactor is recycled through an in-line reformer is typically between 1.5% and 2% by weight, while in those plants having a reformer outside of the recycled gas circuit; and an independent recycle circuit through a gas heater, the carbon content in the DRI may be from 1% to about 4% by weight.

The present invention is addressed to a method and apparatus for producing DRI having a controlled amount of carbon by controlling the amounts of hydrocarbons and CO of the gases within the reduction reactor.

Applicants have found the following patents and patent applications related to the recirculation of top gas from a reduction reactor through a hydrocarbon reformer and a separate gas heater:

U.S. Pat. No. 6,395,055 to Bueno et al. discloses a direct reduction process wherein top gas effluent from the reduction reactor can be recycled in two ways, one through a catalytic reformer and other through a gas heater. Make-up natural gas can be fed to the top gas stream fed to the reformer and also to the top gas stream fed to the heater. This patent however does not teach or suggest to remove $CO_2$ from the portion of the top gas that is recycled through the gas heater, and therefore the amount of top gas that can be recycled is relatively low because a high amount of top gas must be purged and used as fuels in order to get rid of the carbon (as $CO_2$) fed as methane and other hydrocarbons in the natural gas make-up. Although this patent shows that $CH_4$ may be added directly to the reactor it entails the disadvantage of requiring an excessive amount of oxygen for supplementing the heat necessary to raise the temperature of the reducing gas fed to the reactor.

U.S. Pat. No. 6,027,545 to Villarreal discloses a direct reduction process with an improved reducing gas utilization wherein a portion of the reducing gas effluent from the reactor, which would normally be burned as fuel, is recycled to the reactor after regeneration of its reducing potential, by removing water and carbon dioxide therefrom. One embodiment of this patent illustrated in FIG. 3 comprises recycling a portion of the top gas of the reactor by re-heating it in a separate gas heater 34A after $CO_2$ is removed so that most of the top gas containing $H_2$ and CO can be recycled back to the reduction zone of the reactor thus utilizing as much as possible of the reducing gas.

Although, this patent teaches a significant improvement in the reducing gas utilization, there is however no teaching nor suggestion therein about having a first make-up amount of natural gas which will be reformed in the catalytic reformer and having also a second make-up natural gas stream fed with a second portion of $CO_2$-lean top gas nor a teaching of a predetermined distribution of the make-up natural gas fed to the reformer and the make-up gas fed to the reduction zone for obtaining DRI having a predetermined amount of carbon.

U.S. Pat. No. 8,377,417 discloses a direct reduction process wherein $CO_2$ produced in the reduction reactor is stripped from the top gas and can be sequestered for its disposal in a controlled manner instead of emitting it to the atmosphere as part of the fuel burned in the reformer. This patent suggests recycling a portion of the $CO_2$-lean top gas to the reduction reactor which can optionally be preheated using the heat content of the flue gases produced in the reformer after some heat has been taken for steam production. The main make-up stream of natural gas is fed to the reformer where it is consumed; so consequently no control of carbon in the product can be obtained. There is a second natural gas stream added to the reducing gas fed to the reactor, but this addition is not effective to increase the hydrocarbon concentrations; because oxygen also added would have to compensate for the temperature drop caused by such natural gas addition, and therefore the hydrocarbons will be understood to react with said oxygen in order to reach the required reducing temperature. There is no teaching or suggestion in this patent of having a second make-up natural gas stream effective for the expressed purpose of increasing the hydrocarbon concentrations within the reduction reactor; and especially there lacks any teaching of the possibility of a predetermined distribution of the relative amounts of first and second make-up natural gas streams for obtaining a controlled amount of carbon in the DRI and/or a better energy efficiency of the direct reduction process.

OBJECTS OF THE INVENTION

It is therefore an object of the invention to provide a direct reduction process and a plant for producing direct reduced iron (DRI) of improved quality for steelmaking.

It is another object of the invention to provide a method of adjusting the carbon content of the DRI produced in a direct reduction process comprising an in-line $CO_2$-steam hydrocarbon reformer.

It is yet another object of the invention to provide a method for revamping existing direct reduction plants having an in-line $CO_2$-steam hydrocarbon reformer for increasing its production capacity without the need for increasing the capacity of said reformer while also adding the possibility of producing DRI having a given chemically combined carbon content in the form of $Fe_3C$, for enhancing the overall steelmaking process.

It is a further object of the invention to provide a process and plant with an improved energy efficiency and lower capital and operation costs.

Other objects will be pointed out in the description of some exemplary embodiments of the invention or will be evident to those skilled in the art.

SUMMARY OF THE INVENTION

The objects of the invention in its broader aspects can be achieved by providing a direct reduction process producing direct reduced iron (DRI) from iron oxide particles that are reduced at a temperature of about 750° C. or above by means of a reducing gas mainly composed of $H_2$ and CO, that also includes $CO_2$, $H_2O$, and methane, in the reduction reactor of a direct reduction plant and the top gas effluent from the reduction reaction in the reactor is treated as follows: The top gas is split and hydrocarbon-containing make-up gases are fed to each of the resulting separate top gas portions. The first top gas portion with the first make-up gas passes through a catalytic reformer yielding an improved hot reducing gas first effluent. The second top gas portion passes through a $CO_2$ removal unit and then with the second make-up gas passes on through a heater yielding a hot $CO_2$-lean recycle gas second effluent. The first and second effluents are fed to the reduction reactor as the reducing gas. The flow rate of at least the second of the two make-up gases is regulated to control the carbon content of the DRI produced.

Preferably, the flow rate of the second hydrocarbon-containing make-up gas is regulated so that the concentration of hydrocarbon gas (measured as equivalent to methane in the reactor's reducing gas) is in the range between 15% and 25% by volume. This allows the production capacity of a given reduction reactor to be increased without increasing the capacity of the hydrocarbon gas reformer by increasing the amount of the second top gas portion through the $CO_2$ removal unit and the heater and regulating the carbon content of said DRI by modifying the flow rate of the second hydrocarbon-containing make-up gas fed to the second top gas portion.

More particularly, the direct reduction plant includes a reduction reactor for producing a top gas; a first top gas recycle circuit for recycling a first portion of said top gas from the reduction reactor, which first circuit has a reduction zone in said reactor for producing the top gas as an effluent from the reduction of said iron oxide particles, a gas cooler/scrubber for separating water from said top gas resulting in a cooled and dewatered top gas, and a catalytic reformer for reforming a mixture of a first hydrocarbon-containing make-up gas stream by reaction with oxidants present in the first portion of said cooled and dewatered top gas fed thereto to yield an effluent mainly composed of $H_2$ and CO at a temperature on the order of 750° C. or above; a second top gas recycle circuit recycling a second portion of said top gas, that includes said reduction zone in the reactor for producing the top gas as an effluent from the reduction of said iron oxide particles, said gas cooler/scrubber separating water from said top gas resulting in said cooled and dewatered top gas, a carbon dioxide removal unit for stripping at least a portion of the carbon dioxide content of said second portion of said top gas and thus producing a $CO_2$-lean recycle gas, and a process gas heater for raising the temperature of said $CO_2$-lean recycle gas to yield an effluent at a temperature on the order of 750° C. or above; and uniquely feeding a second hydrocarbon-containing make-up gas stream to said second portion of said cooled and dewatered top gas, and also feeding the gas stream effluent from said reformer and the gas stream effluent from said heater to said reduction zone, while regulating the flow rate of the second make-up gas stream so that the carbon content of the DRI produced is regulated within predetermined values in response to the concentration of hydrocarbons in the hot gas effluent from said heater.

DETAILED DESCRIPTION OF PREFERRED EMBODIMENTS OF THE INVENTION

Figure 1:
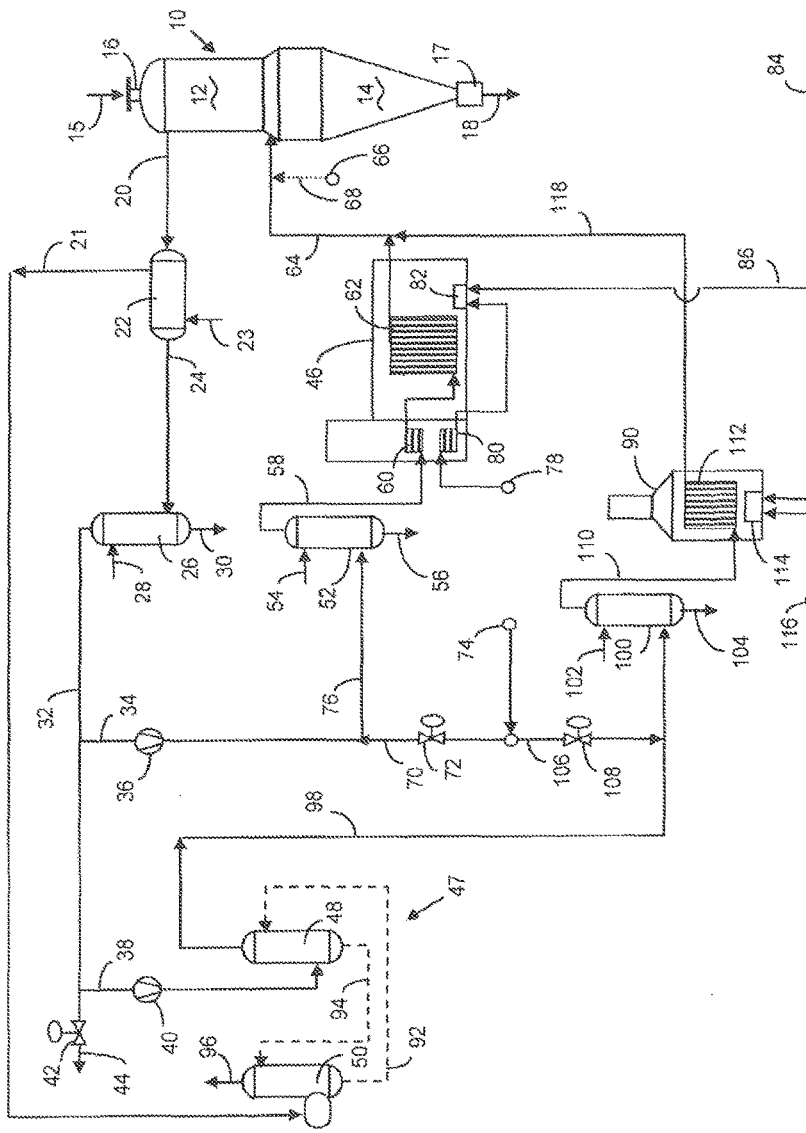
FIG. 1 shows a schematic process diagram of a direct reduction plant incorporating the invention.

Exemplary embodiments of the invention are described with reference to FIG. 1 wherein numeral 10 generally designates a direct reduction reactor having a reduction zone 12 and a lower discharge zone 14, to which iron ore particles 15, containing mainly iron oxides, are fed to the upper portion of zone 12 through at least one inlet 16 and wherein said iron oxides 15 are chemically reduced to direct reduced iron containing metallic iron, also known in the industry as DRI or sponge iron, by reaction of said iron oxides with a reducing gas at high temperature, mostly containing hydrogen and carbon monoxide but which also contains carbon dioxide and water as well as variable amounts of gaseous hydrocarbons, such as methane, propane, butane, and other heavier hydrocarbons present in natural gas, shale gas, coke oven gas or syngas derived from gasification of liquid or solid hydrocarbon fuels.

The ore particles descend by gravity in countercurrent with the upwardly flowing reducing gas at a regulated rate controlled by a suitable mechanism 17, for example a rotary valve, a vibrating pan or screw feeder, and exit the reactor 10 as DRI 18.

A reducing gas stream of reacted reducing gas is withdrawn from reduction zone 12 through pipe 20 as a top gas at a temperature above about 300° C. and containing $H_2$ and CO which did not react with the iron oxides because of the thermodynamic chemical equilibrium and kinetics restrictions of the reduction reactions reached under the operating conditions in the reduction zone 12 of reactor 10, and which also contains oxidants carbon dioxide and water which are gaseous products of said reduction reactions, as well as some un-reacted hydrocarbons, such as $CH_4$.

In order to increase the thermal efficiency and lower the energy consumption of the overall reduction process, as much as possible of the top gas effluent from the reduction zone of the reactor is recycled to said reduction reactor and used in the reducing of the iron ore particles. To this end, the top gas stream, after passing through heat exchanger 22 where its sensible heat is recuperated and used for producing steam, from water 23, which flows through pipe 21 for regeneration of the $CO_2$ absorbing solution at stripper column 50. The recuperated heat may also be used elsewhere, such as for pre-heating reducing gas to be recycled to the reformer in case steam is available from other source.

The top gas exits heat exchanger 22 through pipe 24 and is cooled and washed by direct contact with water 28 at gas cooler/scrubber 26 where $H_2O$ is condensed and withdrawn from the top gas stream through outlet pipe 30. Cold and de-watered top gas flows through pipe 32 and is split in at least two portions: a first portion flowing through pipe 34 and compressor 36 and a second portion flowing through pipe 38 and compressor 40. A small amount of the top gas stream is vented from the reduction system by pressure control valve 42 through pipe 44 for maintaining the pressure in the process system and to prevent inert gases, such as nitrogen from accumulating in the system.

According to an embodiment of the present invention, two different top gas recycle circuits are configured for providing the reduction process and plant with a high energy efficiency and with the capability of adjusting the carbon content of the DRI: A first top gas recycle circuit comprises the reduction zone 12; a cooler/scrubber 26, a compressor 36 and a reformer 46, and a second top gas recycle circuit comprises the reduction zone 12, a cooler/scrubber 26; a compressor 40, a $CO_2$ absorption column 48 (of a $CO_2$ removal unit 47), and a gas heater 90.

The reducing gases $H_2$ and CO consumed by the reduction reactions are produced in the catalytic reformer 46 by reaction of a first make-up gaseous hydrocarbons stream fed to the first gas recycle circuit through pipe 70. The top gas circulating through the first recycle circuit comprising the reformer 46 provides $H_2$ and CO by the reforming reactions of hydrocarbons (mostly $CH_4$) with oxidants $CO_2$ (contained in the top gas stream as product of the reaction of CO with iron oxides) and $H_2O$ (which may be a reaction product passing through, and/or provided at, the cooler/scrubber 26 and/or at the humidifier 52 where the gas can be contacted with water 54 and is saturated).

The first portion of the top gas flows through pipe 34 and compressor 36 and is combined with a first make-up gas stream containing gaseous hydrocarbons, for example natural gas, through pipe 70 from a suitable source 74, regulated by a valve 72. The combined gas stream then flows through pipe 76 to a humidifier 52 where it is saturated with water 54. The excess of water exits the humidifier through pipe 56. Humidifier 52 may optionally not be used if the top gas has the desired humidity after having passed through cooler 26 and compressor 36. The desired amount of water in the gas for reforming may be achieved by regulating the process conditions at cooler 26 and humidifier 52. The water-saturated gas flows through pipe 58 to reformer 46 where it is preheated in convection coils 60 and passes through catalytic tubes 62 where the reformation reactions of hydrocarbons (mainly $CH_4$) with $H_2O$ and $CO_2$ produce hydrogen and carbon monoxide which are fed to the reduction zone 12 of the reactor 10 through transfer line 64, thus completing the first top gas recycle circuit.

Oxygen or an oxygen gas, from a suitable source 66, preferably oxygen of industrial purity may optionally be injected at the transfer line 64 through pipe 68 in order to perform a partial combustion of said gas prior to its introduction into the reduction zone 12 to further increase its temperature to levels in the range of 1000° C. to 1120° C. thereby increasing the kinetics of the reduction reactions for increasing the reduction system productivity.

The second portion of top gas flowing through pipe 38 and compressor 40 passes on through a $CO_2$ removal unit. The illustrated $CO_2$ removal system 47 is of the physical adsorption type, and may alternatively be of the kind where the adsorption and desorption are effected by Pressure Swing Adsorption or Vacuum Pressure Swing Adsorption (PSA or VPSA) known in the art, or may be of the also known kind utilizing molecular membranes. In the illustrated unit 47, the second portion of the top gas passes through the absorption column 48 where most of the $CO_2$ is removed by a suitable solvent, for example an amine solution, which $CO_2$ laden solvent is recycled via pipe 94 from absorber 48 to stripper 50 (where $CO_2$ is removed from the solvent by heat and withdrawn from the stripper 50 through pipe 96 to be used in other processes or sold as raw material or sequestrated, this decreasing the environmental impact of the direct reduction plant. The stripped solvent is then recirculated once again through pipe 92 back into the absorber 48, all in a manner known in the art. The resulting $CO_2$-lean recycle gas is led through pipe 98 to a second humidifier 100 where it gets saturated with water fed through pipe 102 and exits through pipe 104. Adjusting the process conditions in this humidifier, the water content is regulated so that the amount of oxidants in the gas is adequate for the reforming of hydrocarbons with said oxidants: $H_2O$ and $CO_2$ within the reduction circuit (see for example U.S. Pat. No. 5,110,350). A second make-up gas containing hydrocarbons, for example natural gas, from source 74 is fed to the second top-gas recycle circuit through pipe 106 and valve 108. The $CO_2$-lean recycle gas flows thereafter through pipe 110 to a gas heating device, for example a gas heater 90 where it is heated to a temperature above about 750° C., preferably above about 900° C. in heating tubes 112 by heat produced in burners 114 by combustion of fuel from source 84 and air from source 116. The hot $CO_2$-lean recycle gas effluent from the heater 90 flowing through transfer line 118 is combined with hot reformed gas effluent from the reformer 46 flowing through pipe 64, and the resulting combined gas stream is fed to the reduction zone 12 of the reactor 10.

Fuel source 78, preferably preheated in separate convection coils 80 of the reformer 46, can fuel the reformer's burners 82. Source 84 can also at least partially fuel the burners 82 of the reformer 46 fed via pipe 86.

By regulating the flow rates of valves 72 and 108 which respectively control the distribution of the first and second hydrocarbon-containing make-up gas streams derived from source 74, the amount of hydrocarbons present in the hot gas effluent from heater 90 flowing in pipe 118, before mixing with $O_2$ is maintained in the range of 15% to 25% by volume while the reformed gas effluent from reformer 46 is in the range of 2% to 3% by volume, and therefore, the amount of carbon in the DRI produced is regulated by modifying the relative flow rates from hydrocarbon make-up gas source 74. If more hydrocarbon make-up gas is fed to the reformer in the first recycle gas circuit, less carbon will be deposited in the DRI. If more hydrocarbon make-up gas is fed to the second recycle gas circuit passing through heater 90, more carbon will deposited in the DRI because the concentration of hydrocarbons in the reactor 10 will increase.

Additionally the invention provides the advantage for large-capacity direct reduction plants wherein the required amount of reducing gases $H_2$ and CO for a predetermined level of DRI production in reactor 10 is provided for an optimum utilization of the reformer 46, which can be designed and built with a reforming capacity lower than that required by the reactor production capacity, and the additional reducing gases are produced by self-reforming of hydrocarbons.

The invention also provides the possibility of providing said second top gas recycle circuit comprising a $CO_2$ removal unit and a gas heater to an existing direct reduction plant for increasing its DRI production capacity without increasing the capacity of the reformer and adding the possibility of controlling the carbon content in the DRI.

The invention provides the advantage of producing DRI with a carbon content in the range of about 1 to about 4 weight percent thus best adapting the DRI to the particular conditions of the subsequent melting and refining processes of steelmaking. The carbon content may be regulated according to the availability of oxygen in the meltshop and to the specifications of the steel grade to be produced for optimizing the overall steelmaking process. In many applications the carbon content is regulated in the range between about 2 to about 3 weight percent.

Figure 2:
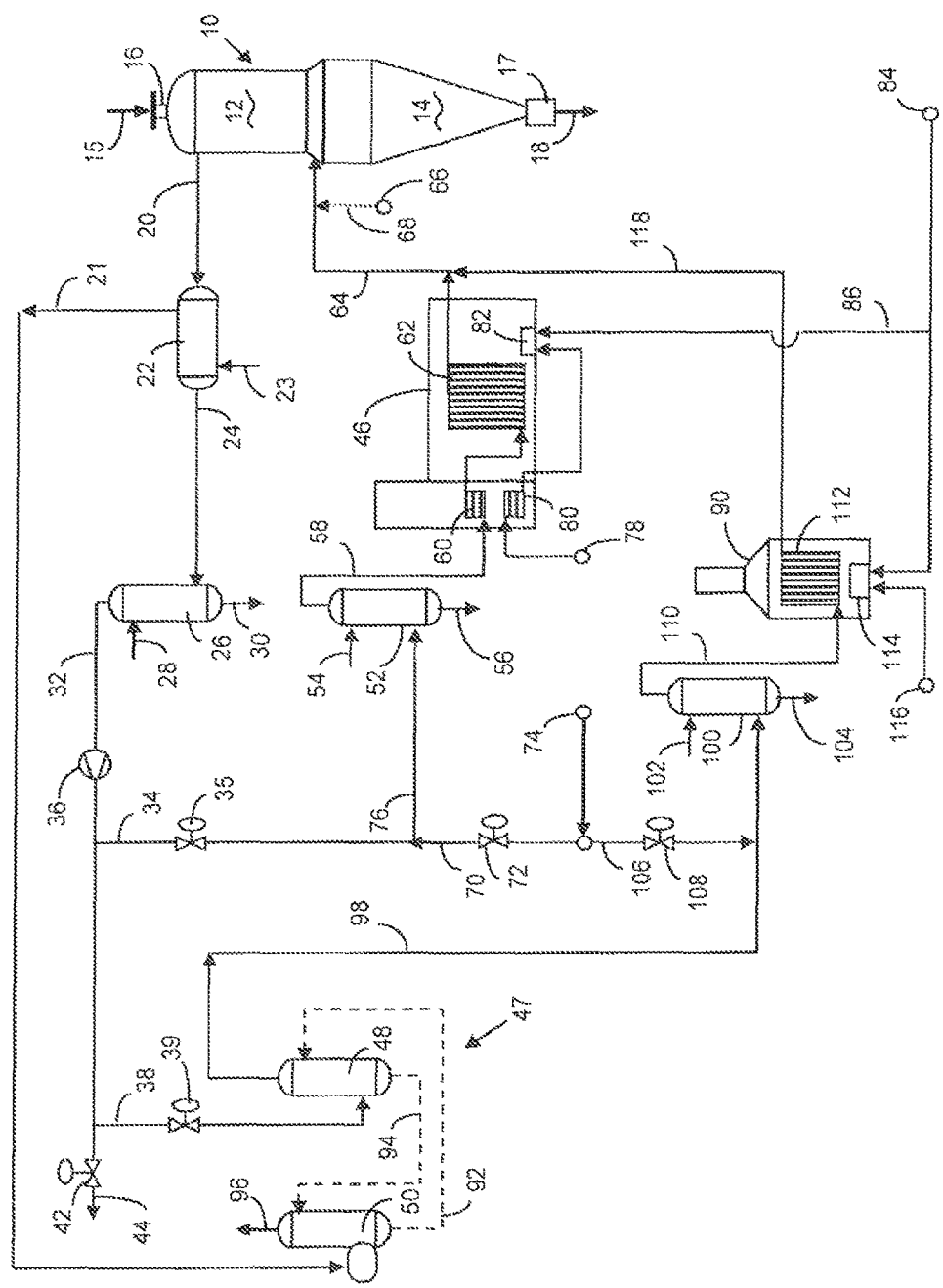
FIG. 2 shows a schematic process diagram of a direct reduction plant incorporating the invention, where only one compressor is utilized for circulating the gases both through the circuit comprising a reformer and the circuit comprising a heater.

Referring to FIG. 2, where the same numerals generally designate the same elements as in FIG. 1, another embodiment of the invention is shown wherein a single compressor 36 is provided for circulation of gases in both the gas circuit passing through reformer 46 and the gas circuit passing through heater 90. This embodiment has some advantages over the embodiment of FIG. 1 having two compressors 36 and 40, regarding capital cost of the direct reduction plant. Two flow regulating valves 35 and 39 are also provided for regulating the distribution of the top gas in each gas circuit. The remainder elements of this embodiment are the same and cooperate as described above with reference to FIG. 1.

Figure 3:
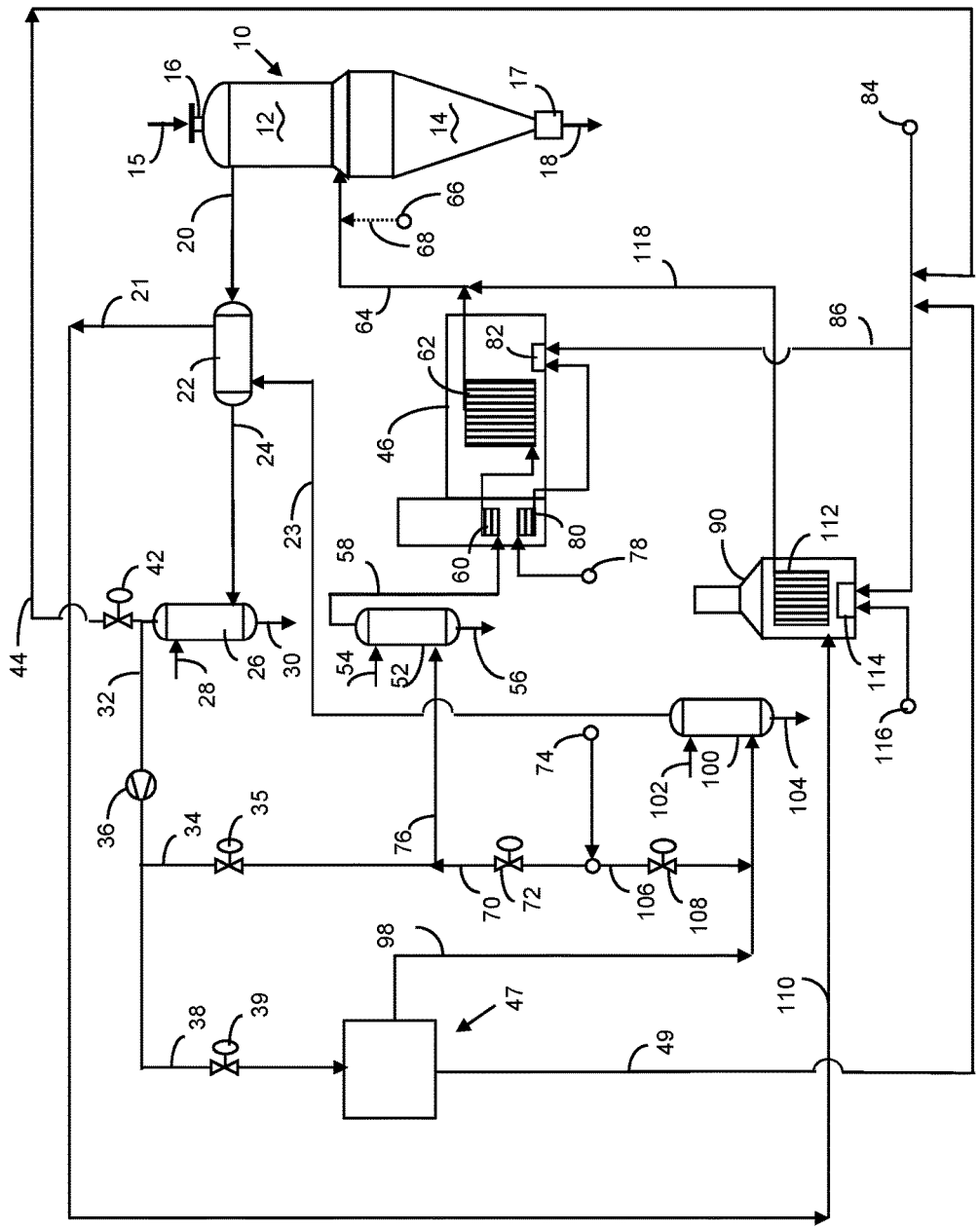
FIG. 3 shows a schematic process diagram of a direct reduction plant incorporating the invention, where the $CO_2$ removal unit is of the PSA or VPSA type and the sensible heat of the gas effluent from the reduction reactor is utilized for pre-heating the gas stream circulating through the gas circuit that includes the heater.

With reference to FIG. 3, where also the same numerals generally designate the same elements as in FIGS. 1 and 2, another embodiment of the invention is shown wherein the $CO_2$ removal unit 47 is of the physical adsorption type, instead of the chemical absorption type as described for the embodiments of FIGS. 1 and 2, and also wherein the sensible heat of the spent reducing gas effluent in pipe 20 (from the reducing zone 12) is utilized in heat exchanger 22 for pre-heating the $CO_2$-lean gas stream (that is recycled, originating from pipe 98 and thereafter passing through pipes 21/110 and heater 90). The $CO_2$ removal unit 47 may be of the PSA or VPSA type as known in the art. In this embodiment, a $CO_2$-laden gas stream, produced when the adsorbing beds are regenerated, still contains some fuel values and is therefore passed through pipe 49 to be utilized as supplemental fuel for the heater 90 and/or the reformer 46. A small amount of spent reducing gas is purged from the spent reducing gas stream by means of pressure control valve 42 and may be utilized through pipe 44 as supplemental fuel in the heater 90 and/or the reformer 46.

All other elements of this embodiment are the same and cooperate in the same manner as described above with reference to FIGS. 1 and 2.

Figure 4:
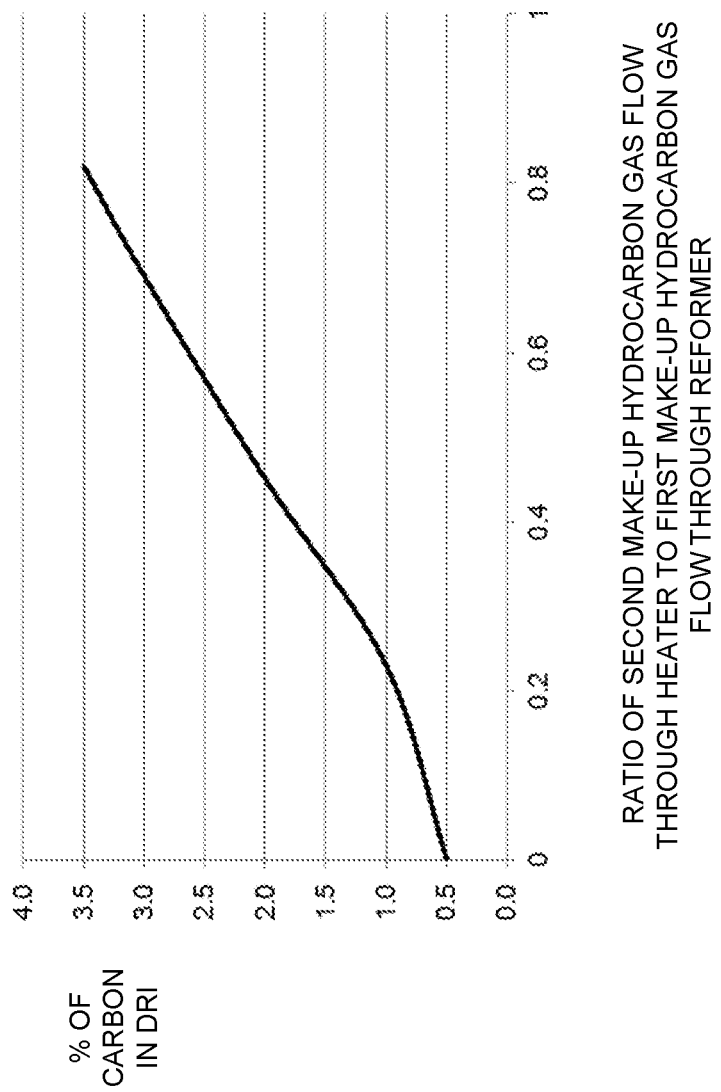
FIG. 4 shows a plot of the variation of the % carbon content in DRI in response to the ratio of the flow rate of the second make-up hydrocarbon gas stream (fed through the heater) with respect to the flow rate of the first make-up hydrocarbon gas stream (fed through the reformer).

An example of the effectiveness of the invention regarding its capability of producing DRI with a desired carbon content is shown in FIG. 4. This illustrates that, by controlling the flow rate of the second hydrocarbon-containing make-up gas stream, the carbon content of the DRI produced is regulated within predetermined values in response to the resulting concentration of hydrocarbons in the hot gas effluent from said heater and therefore also in the gas fed to the reduction reactor. The % carbon content in the DRI was calculated using a mathematical model of the claimed direct reduction process. The results are shown in FIG. 4, where it can be seen that the % carbon in the DRI increases as the flow rate of the second make-up hydrocarbon gas stream in pipe 106 (fed eventually to the heater 90) is increased with respect to the first make-up hydrocarbon gas stream in pipe 70 (fed to the reformer 46).

Figure 5:
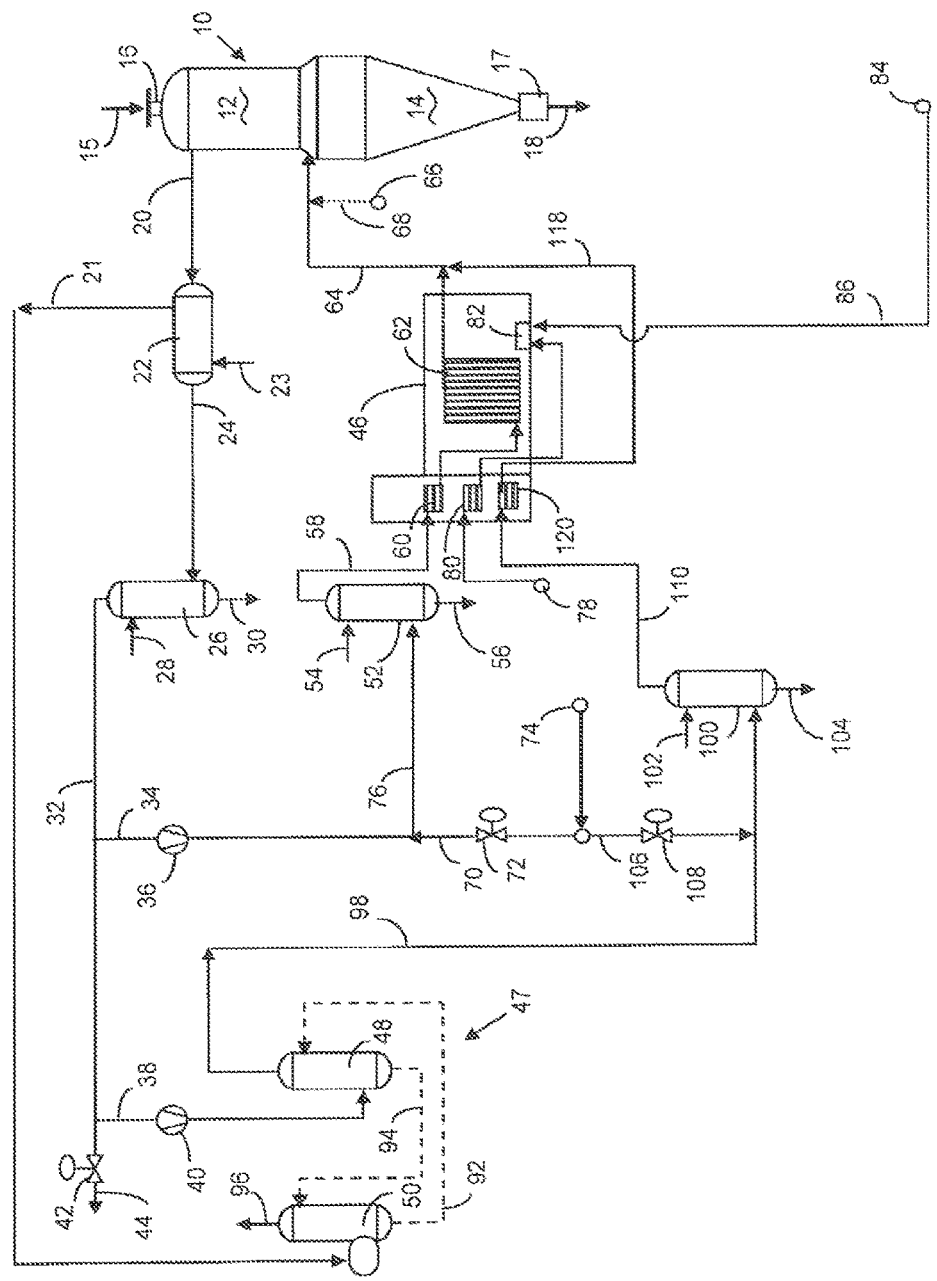
FIG. 5 shows a further embodiment of the invention wherein a portion of the $CO_2$-lean gas stream effluent from the $CO_2$ removal unit is pre-heated in the convective zone of the reformer and is then combined with the reformed gas stream and fed to the reduction reactor.

A further embodiment of the invention is herein described with reference to FIG. 5, where also like numerals designate like elements shown in FIGS. 1, 2 and 3. In this embodiment, the $CO_2$-lean gas stream 98 is combined with natural gas from source 74 in a controlled amount regulated by valve 108 and then humidified in humidifier 100. The recycled gas then flows through pipe 110 to a heating device, which may be a set of heating tubes 120 located in the convection zone of the reformer 46 or a gas heater (not shown), where it is pre-heated to the desired reduction temperature and then is combined through pipe 118 with reducing gas effluent from reformer 46 forming the hot reducing gas stream 64. The rest of the process is shown as described with reference to FIG. 1. In this variant of the invention, there is no separate gas heater (90 in FIGS. 1, 2 and 3) but instead, the heat of the flue gases of reformer 46 is utilized for pre-heating the recycled gas stream.

It will be evident to those skilled in the art that an illustrated embodiment of the invention with variations has been shown and described wherein hot DRI is produced but that the invention can also be applied to direct reduction plants producing cold DRI by adding a DRI cooling circuit to the reactor for cooling the DRI in the lower zone 14 of said reactor or by other known variations not specifically mentioned.

It will also be noted that numerous changes and modifications will become apparent to those skilled in the art and that such changes and modifications are to be understood as taken included within the scope of embodiments of this invention as defined by the attached claims.

What is claimed is:

1. A process producing direct reduced iron (DRI) from iron oxide particles reduced at a temperature of about 750° C. or above by means of a reducing gas mainly composed of $H_2$ and CO, that also includes $CO_2$, $H_2O$, and methane, in a direct reduction plant
comprising
a reduction reactor producing a top gas;
a first top gas recycle circuit recycling a first portion of said top gas,
comprising
    a reduction zone in said reactor producing the top gas as an effluent from the reduction therein of said iron oxide particles,
    a gas cooler/scrubber separating water from said top gas resulting in a cooled and dewatered top gas, and
    a catalytic reformer reforming a mixture of a first hydrocarbon-containing make-up gas stream with oxidants present in a first portion of the cooled and dewatered top gas being fed to the reformer to yield a hot reformer effluent mainly composed of $H_2$ and CO at a temperature on the order of 750° C. or above;
a second top gas recycle circuit recycling a second portion of said top gas,
comprising
    said reduction zone in the reactor producing the top gas as an effluent from the reduction therein of said iron oxide particles,
    said gas cooler/scrubber separating water from said top gas resulting in said cooled and dewatered top gas,
    a carbon dioxide removal unit stripping at least a portion of the carbon dioxide content of said second portion of said top gas and thus producing a CO2-lean recycle gas,
    a process gas heating device raising the temperature of said CO2-lean recycle gas to yield a hot heating device effluent at a temperature on the order of 750° C. or above, and
    feeding, as said reducing gas, the hot reformer effluent and the hot heating device effluent into said reduction zone;
characterized by
    feeding a second hydrocarbon-containing make-up gas stream to said second portion of said cooled and dewatered top gas before said second portion of said cooled and dewatered top gas is heated; and
    regulating the flow rate of the second make-up gas stream so that the carbon content of the DRI produced is regulated within predetermined values in response to the concentration of hydrocarbons in the hot heating device effluent.

2. A process according to claim 1, further characterized by combining the hot reformer effluent and the hot heating device effluent before feeding the resulting combined hot gas stream to the reduction zone of said reactor.

3. A process according to claim 1, further characterized by the hydrocarbon-containing gas being natural gas.

4. A process according to claim 1, further characterized by the hydrocarbon-containing gas being coke oven gas or a gas derived from coke oven gas.

5. A process according to claim 1, further characterized by the hydrocarbon-containing gas being a syngas derived from coal.

6. A process according to claim 1, further characterized by regulating the flow rate of the second make-up stream of hydrocarbon gas for producing DRI having a carbon content in the range of about 1 to about 4 weight percent.

7. A process according to claim 1, further characterized by providing said second top gas recycle circuit as an addition to an existing direct reduction plant, which initially has only said first top gas recycle circuit that includes a reformer, thereby increasing the DRI production capacity of the existing reduction plant without increasing the capacity of the reformer and providing the ability to better control and to increase the carbon content in the DRI produced.

8. A process according to claim 7, further characterized by regulating the flow rate of the second make-up stream of hydrocarbon gas for producing DRI having a carbon content in the range of about 1 to about 4 weight percent.

9. A process according to claim 1, wherein said carbon dioxide removal unit is a chemical absorption unit.

10. A process according to claim 1, wherein said carbon dioxide removal unit is a PSA or VPSA unit.

11. A process according to claim 1, further comprising humidifying said $CO_2$-lean recycle gas whereby gaseous hydrocarbons present in said reducing gas fed to the reduction zone are largely reformed within the reduction zone taking advantage of the catalytic action of metallic iron in the DRI within said reduction reactor.

12. A process according to claim 1, further comprising injecting oxygen or an oxygen enriched gas into said reducing gas prior to its introduction into the reduction zone to aid in increasing the reducing gas temperature with minimal lessening of its reducing potential.

13. A process according to claim 1, wherein said reducing gas is heated to a temperature in the range of about 750° C. to about 1120° C.

14. A process according to claim 1, wherein said heating device is a fired tubular heater.

15. A process according to claim 1, wherein said heating device is a set of heating tubes located in a convection zone of said reformer.

16. A process according to claim 1, further characterized by regulating the flow rate of the first make-up gas stream relative to the flow rate of the second make-up gas stream to regulate the amount of carbon content in the DRI.

17. A process according to claim 1, further characterized by regulating the flow rate of the second make-up stream of hydrocarbon gas so that the concentration of hydrocarbon gas, measured as equivalent to methane in the reactor's reducing gas, is in the range between 15% and 25% by volume.

18. A process producing direct reduced iron (DRI) from iron oxide particles reduced at a temperature of about 750° C. or above by means of a reducing gas mainly composed of $H_2$ and CO, that also includes $CO_2$, $H_2O$, and methane, in a direct reduction plant comprising a reduction reactor producing a top gas;

a first top gas recycle circuit recycling a first portion of said top gas, comprising a reduction zone in said reactor producing the top gas as an effluent from the reduction therein of said iron oxide particles, a gas cooler/scrubber separating water from said top gas resulting in a cooled and dewatered top gas, and a catalytic reformer reforming a mixture of a first hydrocarbon-containing make-up gas stream with oxidants present in a first portion of the cooled and dewatered top gas being fed thereto to yield an effluent mainly composed of $H_2$ and CO at a temperature on the order of 750° C. or above;

a second top gas recycle circuit recycling a second portion of said top gas, comprising said reduction zone in the reactor producing the top gas as an effluent from the reduction therein of said iron oxide particles, said gas cooler/scrubber separating water from said top gas resulting in said cooled and dewatered top gas, a carbon dioxide removal unit stripping at least a portion of the carbon dioxide content of said second portion of said top gas and thus producing a $CO_2$-lean recycle gas, a process gas heating device raising the temperature of said $CO_2$-lean recycle gas to yield an effluent at a temperature on the order of 750° C. or above, and feeding, as said reducing gas, the effluent from said reformer and the effluent from said heating device into said reduction zone, characterized by feeding a second hydrocarbon-containing make-up gas stream to said second portion of said cooled and dewatered top gas; and regulating the flow rate of the second make-up gas stream so that the carbon content of the DRI produced is regulated within predetermined values in response to the concentration of hydrocarbons in the hot gas effluent from said heating device, regulating the flow rate of the first make-up gas stream relative to the flow rate of the second make-up gas stream to regulate the amount of carbon content in the DRI; regulating the flow rate of the second make-up stream of hydrocarbon gas so that the concentration of hydrocarbon gas, measured as equivalent to methane in the reactor's reducing gas, is in the range between 15% and 25% by volume.

19. A process according to claim 18, further characterized by regulating the flow rate of said second make-up stream of hydrocarbon gas for producing DRI having a carbon content in the range of about 2 to about 3 weight percent.

20. A process according to claim 19, wherein said reducing gas is heated by said heating device to above about 900° C. and is further heated by oxygen or an oxygen enriched gas injection to a range of about 1000° C. to about 1100° C.

* * * * *